3,637,815
MICROBICIDES: BIS(ALKANOYLOXYMETHYL)
SULFIDES AND SULFOXIDES
Charles H. Tieman, Modesto, Calif., assignor to Shell
Oil Company, New York, N.Y.
No Drawing. Filed May 23, 1968, Ser. No. 731,645
Int. Cl. C07c 69/16, 69/28, 147/02
U.S. Cl. 260—488 J                            6 Claims

ABSTRACT OF THE DISCLOSURE

Bis(alkanoyloxymethyl) sulfides and sulfoxides, useful as microbicides.

BACKGROUND OF THE INVENTION

Field of the invention

This invention relates to novel bis(alkanoyloxymethyl) sulfides and sulfoxides.

Description of the prior art

U.S. 2,451,895 discloses that certain esters of dihydroxy thioethers are useful as grease bases for lubricant compositions. Bis(acetoxyethyl) sulfide is a known compound described in Jour. Am. Chem. Soc. 42, 1229 (1920).

SUMMARY OF THE INVENTION

This invention is directed to a novel class of bis(alkanoyloxymethyl) sulfides and sulfoxides which have microbicidal activities.

DESCRIPTION OF THE PREFERRED EMBODIMENTS

The novel compounds of the invention can be described by the formula

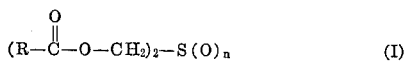

$$(\text{R}-\overset{\text{O}}{\underset{\|}{\text{C}}}-\text{O}-\text{CH}_2)_2-\text{S}(\text{O})_n \qquad (\text{I})$$

wherein R is alkyl of 1–7 carbon atoms, that is, methyl, ethyl, propyl, isopropyl, butyl, tert-butyl, sec-butyl, isobutyl, pentyl, hexyl, heptyl and the like.

When $n$ is 0, these bis(alkanoyloxymethyl) sulfides include such species as bis(acetoxymethyl) sulfide, bis(propionyloxymethyl) sulfide, bis(butyryloxymethyl) sulfide, bis(isobutyryloxymethyl) sulfide, bis(valeryloxymethyl) sulfide, bis(hexanoyloxymethyl) sulfide, bis(heptanoyloxymethyl) sulfide, bis(octanoyloxymethyl) sulfide and the like.

When $n$ is 1, these bis(alkanoyloxymethyl) sulfoxides include such species as bis(acetoxymethyl) sulfoxide, bis(propionyloxymethyl) sulfoxide, bis(butyryloxymethyl) sulfoxide, bis(valeryloxymethyl) sulfoxide, bis(hexanoyloxymethyl) sulfoxide, bis(octanoyloxymethyl) sulfoxide and the like.

The compounds of this invention have been found to be active microbicides against a wide spectrum of microorganisms including bacteria and fungi. While there are qualitative and quantative differences among the compounds of the invention regarding their microbicidal activities, two subclasses within Formula I, i.e., $n$ is O or 1, are active as soil fungicides. For example these compounds have been found to control such plant diseases as Rhizoctonia solani on tomato plants. Fusarium sp. on cotton, Thielaviopsis basicola on pinto beans and Pythium ultimum on sugar beets.

Preferred because of their high order of activity against fungi, and especially molds, are the bis(alkanoyloxymethyl) sulfides. These bis(alkanoyloxymethyl) sulfides are particularly preferred because of their high activity against fungi which cause skin infections such as species of Trichophyton and Epidermophyton. Bis(acetoxymethyl) sulfide and bis(butyryloxymethyl) sulfide are especially active against these pathogenic molds and are, accordingly, preferred species of the invention. Of these, bis(butyryloxymethyl) sulfide is particularly preferred since it appears to have the highest order of activity against molds.

When the compounds of the invention are used as soil fungicides, they may be applied by conventional methods known in the art. Thus, they may be applied to the plants neat or in the conventional formulations such as in aqueous emulsions, solutions, suspensions, dusts, granule and the like. When applied in formulation, the active fungicidal component may vary from 0.1% to as much as 75% by weight or more of the total composition. For field application the compounds of the invention are generally effective in rates of from 0.5 to 30 or more pounds per acre, depending upon the inherent variables of species of compound, species or complex of organisms to be controlled, environmental conditions and the like. Effective resolution of these factors is well within the skill of those versed in the pesticide art.

As fungicidal, fungistatic or antimicrobial agents to control skin diseases, the microbicidally active compound of the invention may be formulated and applied by conventional methods known to the art. Thus, they may be formulated as powders, liquids, salves and the like. Such vehicles as commonly employed in the pharmaceutical formulating art may be used. The amount of the active ingredient in theses formulations may vary from as high as 75% to as little as 0.1% by weight of the total formulation.

PREPARATION

The compounds of the invention are readily prepared by conventional methods known in the art. Thus, the bis(alkanoyloxymethyl) sulfides may be prepared by reaction of bis(chloromethyl) sulfide with a salt of the appropriate alkanoic acid in a suitable solvent. Suitable solvents for the reaction include the corresponding alkanoic acid of the alkanoic acid salt as well as hydrocarbon solvents such as benzene or toluene. These compounds are in turn converted to the corresponding sulfoxides by oxidation of the sulfide using a mild oxidizing agent such as peracetic acid.

The following examples are illustrative of the preparation of the compounds of this invention and of their microbicidal properties. In the preparative examples, "parts" means parts by weight unless otherwise expressly indicated, and parts by weight bear the same relationship to parts by volume as does the kilogram to the liter.

EXAMPLE I

Preparation of bis(acetoxymethyl) sulfide 123 parts of sodium acetate and 66 parts of bis(chloromethyl) sulfide were mixed with 500 parts by volume of acetic acid. The reaction mixture was stirred and heated for 4 hours on a steam bath. Upon cooling, the mixture was filtered and the filtrate was distilled to give 77 parts of a product with a boiling point of 53–58° C. at 0.1 mm. The yield was 87%. The identity of the product was confirmed by elemental analysis—viz percent by weight:

Calculated for $C_6H_{10}O_4S$ (percent): C, 40.4; H, 5.6; S, 18.0; Cl, 0. Found (percent): C, 40.2; H, 5.7; S, 17.8; Cl, 0.

EXAMPLE II

Preparation of bis(butyryloxymethyl) sulfide 6 parts of bis(chloromethyl) sulfide and 19.6 parts of silver butyrate were added to 250 parts by volume of dry benzene. The slurry was stirred at room temperature for 4 days and then filtered. The filtrate was stripped at 25 mm. to 60° C. on a rotary evaporator to leave 10.6 parts of residue. This residue was distilled through a Claisen flask to give 7.5 parts (70% yield) of the colorless liquid, bis(butyryloxymethyl) sulfide, B.P. 92–93° C. (0.6–0.7 mm.). The identity of the product was confirmed by elemental analysis—viz percent by weight.

Calculated for $C_{10}H_{18}O_4S$ (percent): C, 51.3; H, 7.7; S, 13.7; Cl, 0. Found (percent): C, 51.0; H, 7.8; S, 14.0; Cl, 0.9.

EXAMPLE III

Preparation of bis(acetoxymethyl) sulfide

A solution of 54 parts of bis(acetoxymethyl) sulfide, as prepared in Example I, in 500 parts by volume of methylene chloride containing 40 parts of sodiumsulfate was stirred at 5° C. while 57 parts of 40% peracetic acid was added over 1½ hours. After stirring for an additional 3 hours at 5–10° C., the solution was neutralized with sodium carbonate, filtered and the filtrate was evaporated. 51 parts of a liquid was obtained after final stripping at 35° C. (0.005 mm.). The yield was 88%. The identity of the product was confirmed by elemental analysis—viz percent by weight:

Calculated for $C_6H_{10}SO_5$ (percent): S, 16.5. Found (percent): S, 16.0.

Using the general procedures previously described, the following compounds were prepared:

| | B.P. (° C.) | Acid equivalent (g./eq.) Calcd. | Found | Cl (percent by wt.) Calcd. | Found |
|---|---|---|---|---|---|
| Bis(propionyloxymethyl) sulfide | 80–85 at 0.5 mm | 103 | 98.5 | 0.0 | <0.6 |
| Bis(hexanoyloxymethyl) sulfide | 122–123 at 0.07 mm | 145 | 137 | 0.0 | 0.0 |

EXAMPLE IV

Microbicidal activity

The compounds to be tested were suspended or dissolved in acetone, isopropyl alcohol or other suitable solvents to form a concentrated solution or suspension. The final "use" concentrations were prepared by appropriate dilution of this concentrated solution or suspension. The final concentrations were added to sterile trypticase soy broth in tubes. The broth suspensions were then inoculated with 0.05 ml. of a broth culture of each test mold. The molds were cultivated in Sabourauds' maltose broth. Prior to their use in the tests, the mold cultures incubated 72 to 120 hours at 25° C. After inoculation of the tubes with the test molds, the tubes were incubated under standard appropriate conditions and examined for the presence of growth (no inhibitory effect) or the absence of growth (inhibition by the compound). These tubes were compared to a control culture and a chemical control series made in trypticase soy broth. The concentrations, in p.p.m. (parts per million), indicate the minimum concentration to inhibit the growth of the molds.

The species of molds were *Epidermophyton floccosum* and *Trichophton Mentagrophytes*. The results are summarized in Table I.

TABLE I

| | Mold | |
|---|---|---|
| Test compound | E. floccosum | T. mentagrophytes |
| Bis(acetoxymethyl) sulfide | 1.0 | 8.0 |
| Bis(propionyloxymethyl) sulfide | | 1.0 |
| Bis(butyryloxymethyl) sulfide | 0.5 | 0.5 |
| Bis(hexanoyloxymethyl) sulfide | 2.0 | 2.0 |
| Bis(acetoxymethyl) sulfoxide | 2.0 | 0.5 |

I claim as my invention:
1. A compound of the formula

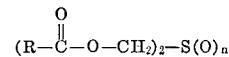

wherein R is alkyl of 1 to 7 carbon atoms and $n$ is 0 or 1.
2. The compound of claim 1 wherein $n$ is 0.
3. The compound of claim 2 wherein R is methyl.
4. The compound of claim 2 wherein R is n-propyl.
5. The compound of claim 1 wherein $n$ is 1.
6. The compound of claim 5 wherein R is methyl.

References Cited

UNITED STATES PATENTS

| 3,121,110 | 2/1964 | La Combe et al. | 260—488 |
| 2,451,895 | 10/1948 | White et al. | 260—488 |
| 3,330,870 | 7/1967 | Randall et al. | 260—488 |

OTHER REFERENCES

Chem. Abstracts, 51:11268b–11270 (1957).

LORRAINE A. WEINBERGER, Primary Examiner

V. GARNER, Assistant Examiner

U.S. Cl. X.R.

260—399, 400; 424—311, 312